United States Patent
Bisson et al.

(10) Patent No.: US 9,011,806 B2
(45) Date of Patent: Apr. 21, 2015

(54) METHOD FOR TREATING A GAS CONTAINING NITROGEN OXIDES ($NO_x$) USING A COMPOSITION COMPRISING ZIRCONIUM, CERIUM AND NIOBIUM AS A CATALYST

(75) Inventors: Laure Bisson, Paris (FR); Julien Hernandez, Antony (FR); Rui Miguel Jorge Coelho Marques, Paris (FR); Emmanuel Rohart, Sainte Soulle (FR); Mila Bortun, Easton, PA (US); Deborah Jayne Harris, Manchester (GB); Clare Jones, Liverpool (GB)

(73) Assignees: Rhodia Operations, Paris (FR); Magnesium Elektron Limited, Salford (GB)

( * ) Notice: Subject to any disclaimer, the term of this patent is extended or adjusted under 35 U.S.C. 154(b) by 0 days.

(21) Appl. No.: 14/001,584

(22) PCT Filed: Feb. 28, 2012

(86) PCT No.: PCT/EP2012/053334
§ 371 (c)(1),
(2), (4) Date: Oct. 28, 2013

(87) PCT Pub. No.: WO2013/037507
PCT Pub. Date: Mar. 21, 2013

(65) Prior Publication Data
US 2014/0044629 A1 Feb. 13, 2014

(30) Foreign Application Priority Data
Mar. 8, 2011 (FR) ...................... 11 00685

(51) Int. Cl.
B01D 53/56 (2006.01)
B01D 53/94 (2006.01)
B01J 21/06 (2006.01)
B01J 23/20 (2006.01)
B01J 37/02 (2006.01)
F01N 3/20 (2006.01)
B01J 29/06 (2006.01)
B01J 35/10 (2006.01)
B01J 37/00 (2006.01)
B01J 23/10 (2006.01)
B01J 37/04 (2006.01)
B01J 35/00 (2006.01)
B01J 29/48 (2006.01)
B01J 29/78 (2006.01)
B01J 29/85 (2006.01)

(52) U.S. Cl.
CPC .... B01D 53/9418 (2013.01); B01D 2251/2062 (2013.01); B01D 2251/2067 (2013.01); B01D 2255/2065 (2013.01); B01D 2255/207 (2013.01); B01D 2255/20715 (2013.01); B01D 2255/50 (2013.01); B01D 2258/012 (2013.01); B01J 21/066 (2013.01); B01J 23/10 (2013.01); B01J 23/20 (2013.01); B01J 37/0203 (2013.01); F01N 3/206 (2013.01); F01N 2610/02 (2013.01); F01N 3/2066 (2013.01); Y02T 10/24 (2013.01); B01J 37/04 (2013.01); B01J 35/0006 (2013.01); B01J 29/06 (2013.01); B01J 29/48 (2013.01); B01J 29/78 (2013.01); B01J 29/85 (2013.01); B01J 35/1014 (2013.01); B01J 37/0009 (2013.01); B01J 2229/16 (2013.01); B01J 2229/32 (2013.01); B01J 2229/36 (2013.01); B01J 2229/37 (2013.01)

(58) Field of Classification Search
USPC .......... 423/213.2, 239.1, 239.2; 60/274, 299, 60/301
See application file for complete search history.

(56) References Cited

U.S. PATENT DOCUMENTS

| 8,617,497 B2 * | 12/2013 | Adelmann et al. ......... 423/213.2 |
| 2008/0095682 A1 | 4/2008 | Kharas et al. |
| 2009/0304566 A1 | 12/2009 | Golden et al. |
| 2013/0189172 A1 * | 7/2013 | Spurk et al. ................ 423/213.2 |
| 2013/0210617 A1 * | 8/2013 | Hernandez et al. ........... 502/242 |

FOREIGN PATENT DOCUMENTS

WO 2008051752 A2 5/2008

OTHER PUBLICATIONS

Casapu M. et al: "Screening of doped MnOx—CeO2 catalysts for low-temperature NO-SCR", Applied Catalysis B: Environmental, Elsevier, vol. 88, No. 3-4, May 20, 2009, pp. 413-419, XP026085610, ISSN: 0926-3373, DOI: 10.1016/J APCATB.2008.10.014 [retrieved on Aug. 14, 2013].

* cited by examiner

Primary Examiner — Timothy Vanoy

(57) ABSTRACT

The invention relates to a method for treating a gas containing nitrogen oxides (NOx), in which an NOx-reduction reaction is carried out using a nitrogen-containing reducing agent, which invention is characterized in that the catalyst used for the reduction reaction is a catalytic system containing a composition comprising zirconium, cerium and niobium in the following percentages by weight, expressed in terms of the weight of oxide: 10-50% of cerium, 5-20% of niobium and the remainder consisting of zirconium.

20 Claims, No Drawings

METHOD FOR TREATING A GAS CONTAINING NITROGEN OXIDES ($NO_x$) USING A COMPOSITION COMPRISING ZIRCONIUM, CERIUM AND NIOBIUM AS A CATALYST

RELATED APPLICATIONS

This application is a U.S. national stage entry under 35 U.S.C. §371 of International Application No. PCT/EP2012/053334 filed Feb. 28, 2012, which claims priority to French Application No. FR 11/00685 filed on Mar. 8, 2011. The entire contents of these applications are explicitly incorporated herein by this reference.

The present invention relates to a process for the treatment of a gas comprising nitrogen oxides ($NO_x$) using, as catalyst, a composition based on zirconium, cerium and niobium.

It is known that motor vehicle engines emit gases comprising nitrogen oxides ($NO_x$) which are harmful to the environment. It is therefore necessary to treat these oxides in order to convert them to nitrogen.

A known method for this treatment is the SCR (Selective Catalytic Reduction) process in which the reduction of the $NO_x$ is carried out with ammonia or a precursor of ammonia, such as urea.

The SCR process makes an effective treatment of the gases possible but, nevertheless, its effectiveness at low temperature could still be improved. Thus, the catalytic systems currently used for the implementation of this process are often effective only for temperatures of greater than 250° C. It would thus be advantageous to have available catalysts which can exhibit a significant activity at temperatures of the order of 250° C.

Catalysts having an improved resistance to ageing, for example which still exhibit a significant effectiveness after having been subjected to a temperature of between 900° C. and 1000° C., are also being sought.

The object of the invention is thus to provide catalysts which are more effective for SCR catalysis.

With this aim, the process of the invention is a process for the treatment of a gas comprising nitrogen oxides ($NO_x$) in which a reaction for the reduction of the $NO_x$ by a nitrogenous reducing agent is carried out and it is characterized in that use is made, as catalyst of this reduction reaction, of a catalytic system comprising a composition based on zirconium, cerium and niobium with the following contents by weight, expressed as oxide:
  cerium oxide: between 5% and 50%, the latter value being excluded;
  niobium oxide: between 5% and 20%;
  the remainder as zirconium oxide.

Other characteristics, details and advantages of the invention will become even more fully apparent on reading the description which will follow, and also the various concrete but non-limiting examples intended to illustrate it.

For the present description, the term "rare earth metal" is understood to mean the elements of the group consisting of yttrium and the elements of the Periodic Table with an atomic number of between 57 and 71 inclusive.

The term "specific surface" is intended to mean the B.E.T. specific surface determined by nitrogen adsorption in accordance with Standard ASTM D 3663-78, drawn up from the Brunauer-Emmett-Teller method described in the periodical "The Journal of the American Chemical Society, 60, 309 (1938)".

The calcinations mentioned in the description are calcinations under air, unless otherwise indicated. The calcination time which is indicated for a temperature corresponds to the duration of the stationary phase at this temperature.

The specific surface values which are indicated for a given temperature and a given time correspond, unless otherwise indicated, to calcinations under air at a stationary phase at this temperature and over the time indicated.

The contents or proportions are given by weight and as oxide (in particular $CeO_2$, $Ln_2O_3$, Ln denoting a trivalent rare earth metal, $Pr_6O_{11}$ in the specific case of praseodymium, $Nb_2O_5$ in the case of niobium), unless otherwise indicated.

It is also specified, for the continuation of the description, that, unless otherwise indicated, in the ranges of values which are given, the values at the limits are included.

The composition of the catalytic system of the invention is characterized by the nature and the proportions of its constituents.

Thus, it is based on zirconium, cerium and niobium, the elements zirconium, niobium and cerium being present in the composition generally in the form of oxides. However, it is not ruled out for these elements to be able to be present at least in part in another form, for example in the form of hydroxides or of oxyhydroxides.

Furthermore, these elements are present in the specific proportions which were given above.

The proportion by weight as cerium oxide of the composition can be in particular between 5 and 40%, more particularly between 10 and 40% or 15 and 40% and more particularly still between 10 and 30% or 15 and 30%.

The proportion by weight as niobium oxide of the composition can more particularly be between 5 and 15% and more particularly still between 5 and 10%. A reduced effectiveness of the composition is recorded below 5% and an improvement in the effectiveness is no longer recorded above 20%.

According to a specific embodiment of the invention, the content as zirconium oxide can more particularly be between 60% and 85% and more particularly still between 65% and 80%.

According to another embodiment of the invention, the composition of the catalytic system of the invention additionally comprises at least one element M chosen from the group consisting of tungsten, molybdenum, iron, copper, silicon, aluminium, manganese, titanium, vanadium and the rare earth metals other than cerium, with the following proportions, expressed as weight of oxide:
  cerium oxide: between 5% and 50%, the latter value being excluded;
  niobium oxide: from 5% to 20%;
  oxide of the element M: up to 20%;
  the remainder as zirconium oxide.

As for zirconium or cerium, the element M is present in the composition generally in the oxide form but other forms (hydroxides or oxyhydroxides) are not ruled out.

This element M can in particular act as stabilizer for the specific surface of the mixed zirconium and cerium oxide or can also improve the reducibility of the composition. For the continuation of the description, it should be understood that while, for the sake of simplicity, only one element is mentioned, it is clearly understood that the invention applies to the case where the compositions comprise several elements M.

The maximum proportion as oxide of the element M in the case of the rare earth metals and tungsten can more particularly be at most 15% and more particularly still at most 10% by weight of oxide of the element M (rare earth metal and/or tungsten). The minimum content is at least 1%, more particularly at least 2%, the contents given above being expressed with respect to the zirconium oxide/cerium oxide/niobium oxide/oxide of the element M combination.

In the case where M is neither a rare earth metal nor tungsten, the content as the oxide of the element M can more particularly be at most 10% and more particularly still at most 5%. The minimum content can be at least 1%. This content is expressed as oxide of the element M with respect to the zirconium oxide, cerium oxide, niobium oxide and oxide of the element M combination.

In the case of the rare earth metals, the element M can more particularly be a rare earth metal other than yttrium, in particular lanthanum, praseodymium and neodymium.

The invention also relates to the case where the compositions are essentially composed of the abovementioned elements zirconium, cerium, niobium and, if appropriate, element M. The term "are essentially composed" is understood to mean that the composition under consideration comprises only the abovementioned elements, in the forms mentioned above, and that it does not comprise any other functional element, that is to say an element capable of having a positive influence on the catalytic action, the reducibility and/or the stability of the composition. On the other hand, the combination can comprise elements, such as impurities, which can originate in particular from its process of preparation, for example from the starting materials or the starting reactants used.

The compositions of the catalytic system of the invention exhibit a specific surface which is sufficiently stable, that is to say sufficiently high at high temperature, for them to be able to be used in the field of catalysis.

Thus, generally, the compositions of the catalytic system of the invention can exhibit a specific surface, after calcination at 800° C. for 4 hours, which is at least 35 m$^2$/g, more particularly at least 40 m$^2$/g.

The compositions of the catalytic system of the invention can also exhibit a specific surface, after calcination at 900° C. for 4 hours, which is at least 15 m$^2$/g, more particularly at least 20 m$^2$/g.

The compositions can optionally be provided in the form of a solid solution of the oxides of niobium, of cerium and, if appropriate, of the element M in the zirconium oxide. In this case, the presence of a single phase is then observed by X-ray diffraction, which phase corresponds to the cubic or tetragonal phase of the mixed cerium and zirconium oxide. This single phase can exist for compositions which have been subjected to calcinations up to a temperature of 900° C.

The compositions of the catalytic system of the invention can be prepared by the known impregnation process. Thus, a mixed zirconium and cerium oxide prepared beforehand is impregnated with a solution comprising a niobium compound, for example an oxalate or an ammonium niobium oxalate. In the case of the preparation of a composition which additionally comprises an oxide of the element M, use is made, for the impregnation, of a solution which comprises a compound of this element M in addition to the niobium compound. The element M can also be present in the starting mixed zirconium and cerium oxide which is impregnated.

Use is made more particularly of dry impregnation. Dry impregnation consists in adding, to the product to be impregnated, a volume of a solution of the impregnating element which is equal to the pore volume of the solid to be impregnated.

The zirconium and cerium oxide must exhibit specific surface properties which render it capable of use in catalysis. Thus, this specific surface must be stable, that is to say that it must exhibit a value sufficient for such a use even at high temperature.

Mention may be made, for such an oxide, optionally with an element M, in particular in the case where M is a rare earth metal, as products which are suitable for the present invention, of those described in particular in Patent Applications EP 605 274, EP 1 991 354, EP 614 854, EP 863 846, EP 1 527 018, EP 1 603 667, EP 2 007 682 and EP 2 024 084. Reference may thus be made, for the implementation of the present invention, if necessary, to the combined description of the abovementioned patent applications.

Furthermore, the composition of the invention can also be prepared by known processes of the coprecipitation type, in which process a base is added to a solution comprising the salts of the constituent elements of the composition and then the precipitate obtained is calcined, or also of the solid/solid reaction type, in which oxides of these elements or precursors of these oxides are milled and then the mixture resulting from the milling is calcined.

The catalytic system used in the process of the invention comprises a composition as described above, this composition generally being mixed with a material normally employed in the field of catalyst formulation, that is to say a material chosen from thermally inert materials. This material can thus be chosen from alumina, titanium oxide, cerium oxide, zirconium oxide, silica, spinels, silicates, crystalline silicoaluminium phosphates or crystalline aluminium phosphates.

Generally, the catalytic system used in the process of the invention can be composed of the abovementioned mixture deposited on a substrate. More specifically, the mixture of the composition and of the thermally inert material constitutes a coating (washcoat) having catalytic properties and this coating is deposited on a substrate of the, for example, monolith type, made of metal, for example Fecralloy, or of ceramic, for example of cordierite, of silicon carbide, of alumina titanate or of mullite.

This coating is obtained by mixing the composition with the thermally inert material so as to form a suspension, which can subsequently be deposited on the substrate.

According to another embodiment, the catalytic system used in the process of the invention can be based on the composition as described above, the latter being used in an extruded form. It can thus be provided in the form of a monolith having a honeycomb structure or in the form of a monolith of particle filter type (channels partially closed). In both these cases, the composition of the invention can be mixed with additives of type known to facilitate the extrusion and to guarantee the mechanical strength of the extrudate. Such additives can be chosen in particular from silica, alumina, clays, silicates, titanium sulphate or ceramic fibres, in particular in proportions generally used, that is to say up to approximately 30% by weight, with respect to the combined combination.

The invention also relates to a catalytic system which comprises a zeolite in addition to the composition based on cerium, zirconium and niobium.

The zeolite can be natural or synthetic and it can be of aluminosilicate, aluminophosphate or silicoaluminophosphate type.

Use is preferably made of a zeolite which has been subjected to a treatment for the purpose of improving its high-temperature stability. Mention may be made, as example of treatment of this type, of (i) dealumination by treatment with steam and acid extraction using an acid or complexing agent (for example EDTA, ethylenediaminetetraacetic acid); by treatment with an acid and/or a complexing agent; or by treatment with an SiCl$_4$ gas stream; (ii) cationic exchange by use of polyvalent cations, such as La cations; and (iii) use of phosphorus-comprising compounds.

According to another specific embodiment of the invention and in the case of a zeolite of aluminosilicate type, this zeolite can exhibit an Si/Al atomic ratio of at least 10, more particularly of at least 20.

According to a more specific embodiment of the invention, the zeolite comprises at least one other element chosen from the group consisting of iron, copper and cerium.

The term "zeolite comprising at least one other element" is intended to mean a zeolite, to the structure of which have been added, by ion exchange, impregnation or isomorphic substitution, one or more metals of the abovementioned type.

In this embodiment, the metal content can be between approximately 1% and approximately 5%, which content is expressed as weight of metal element with respect to the zeolite.

Mention may more particularly be made, as zeolites of the aluminosilicate type which can participate in the formation of the composition of the catalytic system of the invention, of those chosen from the group consisting of beta, gamma, ZSM 5 and ZSM 34 zeolites. Mention may be made, for the zeolites of aluminophosphate type, of those of the SAPO-17, SAPO-18, SAPO-34, SAPO-35, SAPO-39, SAPO-43 and SAPO-56 types.

In the catalytic system of the invention, the percentage by weight of zeolite with respect to the total weight of the composition can vary from 10 to 70%, more preferably from 20 to 60% and more preferably still from 30 to 50%.

For the implementation of this alternative form with zeolite of the catalytic system, it is possible to carry out a simple physical mixing of the composition based on cerium, zirconium and niobium and of the zeolite.

This alternative form of the invention employing the combination of a zeolite as described above and of the composition of the invention confers an improved activity on the catalytic system of the invention as regards reduction of the $NO_x$.

The gas treatment process of the invention is a process of SCR type, use of which is well known to a person skilled in the art.

It may be remembered that this process uses, as reducing agent for the $NO_x$, a nitrogenous reducing agent which can be ammonia, hydrazine or any appropriate precursor of ammonia, such as ammonium carbonate, urea, ammonium carbamate, ammonium hydrogencarbonate, ammonium formate or also ammonia-comprising organometallic compounds. Ammonia or urea may more particularly be chosen.

Several chemical reactions can be employed in the SRC process for the reduction of the $NO_x$ to elemental nitrogen. Only some of the reactions capable of taking place, ammonia being the reducing agent, are given below and by way of example.

A first reaction can be represented by the equation (1)

$$4NO+4NH_3+O_2 \rightarrow 4N_2+6H_2O \quad (1)$$

Mention may additionally be made of the reaction of $NO_2$ present in the $NO_x$ with $NH_3$ according to the equation (2)

$$3NO_2+4NH_3 \rightarrow (7/2)N_2+6H_2O \quad (2)$$

Furthermore, the reaction between $NH_3$ and NO and $NO_2$ can be represented by the equation (3)

$$NO+NO_2+2NH_3 \rightarrow 2N_2+3H_2O \quad (3)$$

The process can be employed for the treatment of a gas originating from an internal combustion engine (mobile or stationary), in particular from an engine of a motor vehicle, or of gas originating from a gas turbine, from power stations operating with coal or fuel oil, or from any other industrial plant.

According to a specific embodiment, the process is used to treat the exhaust gas from a lean-burn internal combustion engine or from a diesel engine.

The process can also be implemented using, in addition to the composition of the invention, another catalyst which is a catalyst for the oxidation of the nitrogen monoxide of the gas to give nitrogen dioxide. In such a case, the process is used in a system in which this oxidating catalyst is positioned upstream of the point of injection of the nitrogenous reducing agent into the exhaust gas.

This oxidation catalyst can comprise at least one metal from the platinum group, such as platinum, palladium or rhodium, on a support of alumina, ceria, zirconia or titanium oxide type, for example, the catalyst/support combination being included in a coating (washcoat) on a substrate of monolith type, in particular.

According to an advantageous alternative form of the invention and in the case of an exhaust system equipped with a particle filter intended to halt the carbonaceous particles or soot generated by the combustion of the various fuels, it is possible to implement the gas treatment process of the invention by positioning the catalytic system which was described above on this filter, for example in the form of a washcoat deposited on the walls of the filter. It is observed that the use of the compositions of the invention according to this alternative form makes it possible in addition to reduce the temperature from which the combustion of the particles begins.

Examples will now be given.

EXAMPLE 1

This example relates to the preparation of a composition based on cerium oxide, zirconium oxide and niobium oxide in the respective proportions by weight of 18%, 72% and 10%.

An ammonium niobium (V) oxalate solution is prepared by dissolution under hot conditions of 192 g of ammonium niobium (V) oxalate in 300 g of deionized water. This solution is maintained at 50° C. The concentration of this solution is 14.2% as $Nb_2O_5$. A powder formed of a mixed cerium and zirconium oxide (composition by weight $CeO_2/ZrO_2$ 20%/80%, specific surface after calcination at 800° C. for 4 hours of 62 m²/g) is subsequently impregnated with this solution up to saturation of the pore volume.

The impregnated powder is subsequently calcined at 800° C. for 4 hours.

EXAMPLE 2

This example relates to the preparation of a composition based on cerium oxide, zirconium oxide and niobium oxide in the respective proportions by weight of 19%, 74% and 7%.

An ammonium niobium (V) oxalate solution is prepared by dissolution under hot conditions of 134 g of ammonium niobium (V) oxalate in 300 g of deionized water. This solution is maintained at 50° C. The concentration of this solution is 9.9% as $Nb_2O_5$. A powder formed of a mixed cerium and zirconium oxide identical to that of Example 1 is subsequently impregnated with this solution. The impregnated powder is subsequently calcined at 800° C. for 4 hours.

COMPARATIVE EXAMPLE 3

This example relates to the preparation of a composition based on cerium oxide, zirconium oxide and niobium oxide in the respective proportions by weight of 19%, 78% and 3%.

An ammonium niobium (V) oxalate solution is prepared by dissolution under hot conditions of 58 g of ammonium niobium (V) oxalate in 300 g of deionized water. This solution is maintained at 50° C. The concentration of this solution is 4.3% as $Nb_2O_5$. A powder formed of a mixed cerium and zirconium oxide identical to that of Example 1 is subsequently impregnated with this solution up to saturation of the pore volume.

The impregnated powder is subsequently calcined at 800° C. for 4 hours.

The surface characteristics of the products of the preceding examples are given in Table 1 below.

TABLE 1

| Example | Specific surface (m²/g) | |
|---|---|---|
| | 800° C. 4 hours | 900° C. 4 hours* |
| 1 | 37 | 20 |
| 2 | 42 | 25 |
| 3 | 50 | 28 |

*This specific surface applies to the products as obtained in the preceding examples, that is to say having already been calcined at 800° C. for 4 hours.

EXAMPLE 4

This example describes the catalytic properties of the compositions of the preceding examples in SCR catalysis. These properties are evaluated under the following conditions.

In a first series of measurements, the compositions used are those resulting directly from the syntheses described in the preceding examples, that is to say compositions which have been subjected to a calcination at 800° C. for 4 hours.

In a second series of measurements, the compositions used are those of the preceding examples but after additional calcination at 900° C. and 1000° C. for 2 hours in both cases.

The compositions are subsequently evaluated in a catalytic test. In this test, a synthetic gas mixture representative of the catalysis process (Table 2) is passed (30 l/h) over the composition (90 mg).

TABLE 2

| Composition of a representative mixture | |
|---|---|
| $NH_3$ | 500 vpm |
| NO | 500 vpm |
| $O_2$ | 13 vol % |
| $H_2O$ | 5 vol % |
| $N_2$ | remainder |

The conversion of the $NO_x$ as a function of the temperature of the gas mixture is monitored.

The results are given as % of conversion of the $NO_x$ (in this instance, NO and $NO_2$) at two temperatures of the gas mixture, 250° C. and 400° C., in the following Table 3.

TABLE 3

| | Conversion of the $NO_x$ at 250° C./400° C. after calcination of the composition at | | |
|---|---|---|---|
| Example | 800° C. 4 hours | 900° C. two hours | 1000° C. two hours |
| 1 | 75/90 | 55/90 | 25/70 |
| 2 | 65/90 | 55/90 | 25/75 |
| 3 comparative | 28/80 | | |

It is found that the compositions according to the invention exhibit, at 400° C., an improved activity with respect to that of the comparative example, this activity being much greater at low temperature (250° C.) than that of the composition according to the same comparative example. The activity still remains significant after ageing of the compositions at 900° C. or 1000° C.

The invention claimed is:

1. Process for the treatment of a gas comprising nitrogen oxides ($NO_x$), the process comprising reducing the $NO_x$ by a nitrogenous reducing agent in the presence of a catalytic system comprising a composition based on zirconium, cerium and niobium with the following contents by weight, expressed as oxide:
   cerium oxide between 5% and 50%, the latter value being excluded;
   niobium oxide between 5% and 20%;
   the remainder as zirconium oxide.

2. Process according to claim 1, wherein the composition additionally comprises at least one element M chosen from the group consisting of tungsten, molybdenum, iron, copper, silicon, aluminium, manganese, titanium, vanadium and the rare earth metals other than cerium, with the following proportions, expressed as weight of oxide:
   cerium oxide: between 5% and 50%, the latter value being excluded;
   niobium oxide: from 5% to 20%;
   oxide of the element M: up to 20%;
   the remainder as zirconium oxide.

3. Process according to claim 1, wherein the composition exhibits a proportion by weight as cerium oxide of between 5 and 40%.

4. Process according to claim 3, wherein the composition exhibits a proportion by weight as cerium oxide of between 10 and 40%.

5. Process according to claim 4, wherein the composition exhibits a proportion by weight as cerium oxide of between 10 and 30%.

6. Process according to claim 1, wherein the composition exhibits a proportion by weight as niobium oxide of between 5 and 15%.

7. Process according to claim 6, wherein the composition exhibits a proportion by weight as niobium oxide of between 5 and 10%.

8. Process according to claim 1, wherein the catalytic system additionally comprises a zeolite.

9. Process according to claim 1, wherein the nitrogenous reducing agent comprises ammonia or urea.

10. Process according to claim 1, wherein the gas is an exhaust gas from an engine of a motor vehicle.

11. Process according to claim 10, wherein the catalytic system is positioned on a particle filter or wherein the catalytic system comprises the composition in an extruded form.

12. Process according to claim 2, wherein the composition exhibits a proportion by weight as cerium oxide of between 5 and 40%.

13. Process according to claim 12, wherein the composition exhibits a proportion by weight as cerium oxide of between 10 and 40%.

14. Process according to claim 13, wherein the composition exhibits a proportion by weight as cerium oxide of between 10 and 30%.

15. Process according to claim 2, wherein the composition exhibits a proportion by weight as niobium oxide of between 5 and 15%.

16. Process according to claim 15, wherein the composition exhibits a proportion by weight as niobium oxide of between 5 and 10%.

17. Process according to claim 2, wherein the catalytic system additionally comprises a zeolite.

18. Process according to claim 2, wherein the nitrogenous reducing agent comprises ammonia or urea.

19. Process according to claim 2, wherein the gas is an exhaust gas from an engine of a motor vehicle.

20. Process according to claim 19, wherein the catalytic system is positioned on a particle filter or wherein the catalytic system comprises the composition in an extruded form.

* * * * *